United States Patent
Lawson

(10) Patent No.: US 8,951,413 B2
(45) Date of Patent: Feb. 10, 2015

(54) SAFETY GRATE COVER FOR A SWIMMING POOL

(75) Inventor: Robert B. Lawson, Naples, FL (US)

(73) Assignee: Hydrotech Pty Ltd., West Lakes (AU)

( * ) Notice: Subject to any disclaimer, the term of this patent is extended or adjusted under 35 U.S.C. 154(b) by 332 days.

(21) Appl. No.: 13/317,013

(22) Filed: Oct. 7, 2011

(65) Prior Publication Data

US 2012/0144578 A1    Jun. 14, 2012

Related U.S. Application Data

(63) Continuation-in-part of application No. 12/156,414, filed on Jun. 2, 2008, now abandoned.

(51) Int. Cl.
| | | |
|---|---|---|
| E04H 4/14 | (2006.01) | |
| E04H 4/12 | (2006.01) | |
| E04H 4/06 | (2006.01) | |
| B01D 29/00 | (2006.01) | |
| B01D 29/01 | (2006.01) | |
| B01D 29/03 | (2006.01) | |

(52) U.S. Cl.
CPC ............... *E04H 4/1218* (2013.01); *E04H 4/06* (2013.01); *E04H 4/1236* (2013.01); *B01D 29/0009* (2013.01); *B01D 29/0097* (2013.01); *B01D 29/014* (2013.01); *B01D 29/035* (2013.01)
USPC ...... 210/163; 210/167.16; 210/474; 210/498; 4/504; 4/507

(58) Field of Classification Search
CPC ........... E04H 4/06; E04H 4/12; E04H 4/1218; E04H 4/14; E04H 4/1236; B01D 29/0009; B01D 29/0097; B01D 29/014; B01D 29/035; B01D 2201/184
USPC ......... 210/163, 164, 167.16, 474, 498; 4/490, 4/496, 504, 507
See application file for complete search history.

(56) References Cited

U.S. PATENT DOCUMENTS

| | | | | |
|---|---|---|---|---|
| 3,378,858 | A * | 4/1968 | Jacuzzi | 210/163 |
| 4,658,449 | A * | 4/1987 | Martin | 210/163 |
| 5,130,016 | A * | 7/1992 | Gavin | 210/164 |
| 6,170,095 | B1 * | 1/2001 | Zars | 4/507 |
| 6,397,408 | B1 * | 6/2002 | Veloskey et al. | 4/504 |
| 6,442,774 | B2 * | 9/2002 | Wilson et al. | 4/504 |
| 6,453,482 | B1 * | 9/2002 | Mullings | 4/507 |
| 6,751,814 | B2 * | 6/2004 | Mattson, Jr. et al. | 4/504 |
| 7,144,185 | B2 * | 12/2006 | Messerschmidt et al. | 210/164 |
| 7,178,179 | B2 * | 2/2007 | Barnes | 4/507 |
| 7,419,588 | B2 * | 9/2008 | Lawson | 210/164 |
| 7,820,041 | B2 * | 10/2010 | Hilton et al. | 210/163 |

* cited by examiner

*Primary Examiner* — Christopher Upton
(74) *Attorney, Agent, or Firm* — Neifeld IP Law, PC

(57) ABSTRACT

A grate cover being installed in a recess in the top of a sump. The grate is formed of an upper and a lower section. The upper section exhibits four squares or four triangles therein, The upper section has a dome-shaped configuration and has four square or triangular shapes therein, depending on the geometric division therein, each shape has openings therein. The lower section has four trapezoid shapes therein. Each of the shapes of the upper section, whether square or triangular, has a concave surface curvature therein at a transition between the upper and the lower section. Each of the trapezoids of the lower section has two concave surfaces curvatures therein. One curvature extends in a first direction from the upper section toward an outside edge of grate cover. The other second concave curvature extends in a direction which is normal to the first direction.

14 Claims, 5 Drawing Sheets

SAFETY GRATE COVER FOR A SWIMMING POOL

This application is a Continuation-In-Part of application Ser. No. 12/156,414 filed Jun. 2, 2008 now abandoned

FIELD OF THE INVENTION

Most all swimming pools have a drainage sump located mostly in the deep end bottom for draining the pool when necessary and also for participating in the circulation of the pool water which is circulating through the filter system. Other pool systems are known as wading pools or Jacuzzis.

BACKGROUND OF THE INVENTION

The above mentioned pools have a sump in the lowest point of the pool and is of a pot-like configuration and has a grating installed over the opening of the sump to prevent any of the larger debris or children's toys from entering into the sump and to prevent any human limbs or larger areas of the human body to make contact with the considerable suction force in the bottom of the sump to avoid any injuries. The considerable suction in the bottom of the sump creates quite a forceful suction on the top of the grate that covers the sump. It has been known that many injuries have occurred to a human being suctioned onto the sump cover without being able to extricate him or herself without any help. Most of the sump covers known in the art have a flat surface thereon and the covers have many interstices therein to catch anything on the flat surface thereon while the water is suctioned into the sump. It has been found, in many instances, the force of the suction is of such intensity so that a human body can be trapped on top of the cover and the body of the person cannot be removed unless emergency procedures are undertaken.

Steps have been taken alleviate a person from being sucked onto the cover. The above identified application has almost solved the problem by making the cover in a dome-shaped configuration. This way, no flat surfaces are presented to any part of the human body to thereby eliminate any chance of being sucked onto the surface of the grate cover.

Other constructions have taken a different approach to this problem by having a sensor installed in the water suction line that would sense any increase in the force of the suction and after a short delay would cut off the suction. However, this approach has the disadvantage that by the time the increase in suction is being sensed, the person is already pulled down by the force of the suction and still could obtain a serious injury.

BRIEF DESCRIPTION OF THE INVENTION

As mentioned above, this invention is a Continuation-In-Part of a prior application. The prior application has a dome-shaped grate cover covering the sump. Since this dome-shaped grate cover is almost fool-proof with regard to any injuries, the present inventive concept is a further improvement over the prior grate cover. The present invention still has a dome-shaped cover but is divided into an upper section and a lower section. The upper section has four squares in one type of geometric division or four triangles in another type of geometric division and each of the squares or triangles has square-shaped interstices or openings and exhibits a surface concave curve at the transition to the lower section. The lower section has four trapezoids, that is, this shape has two parallel sides and two non-parallel sides, and each of the trapezoids has a first surface concave curve extending in a direction toward the outside of the cover and furthermore has a second concave curve in a direction which is normal to the direction of the first concave curve. This arrangement assures that there is never a chance of any part of the human body being suctioned onto the grate cover because of the above curvatures there is always a lateral flow of suctioned water into the sump and under a person being in close contact with the cover.

DETAILED DESCRIPTION OF THE INVENTION

Figure 1:
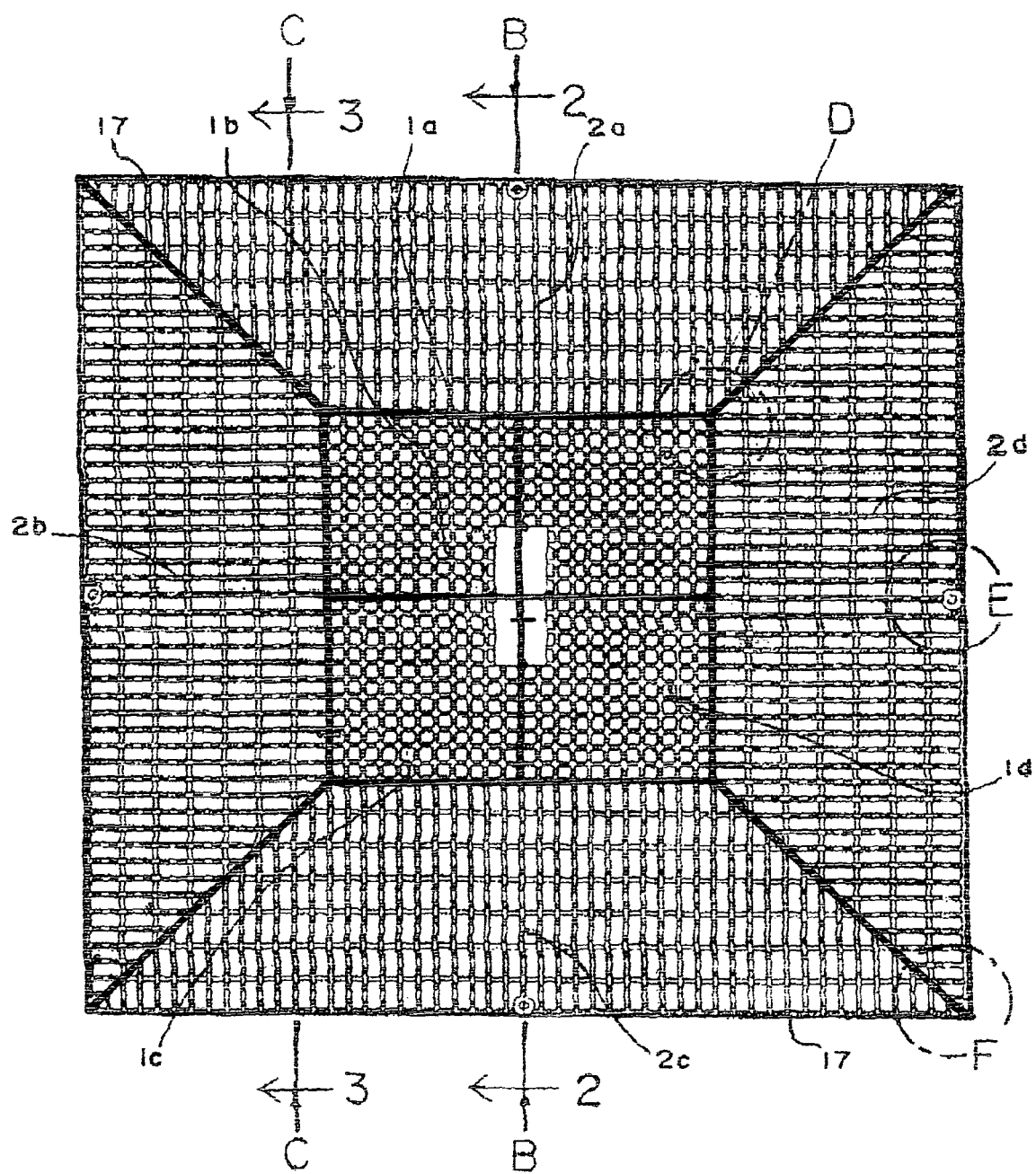
FIG. 1 is a top view of the inventive grate cover.

FIG. 1 is a top view of the grate cover having a domed section. The basic cover is in a square configuration and as seen from the center top there are four downwardly sloping squares 1a, 1b, 1c and 1d. There is a transitional area between the upper section and a lower section 2. The transitional area is shown by the circle D and FIG. 4. The lower section 2 again is divided into four trapezoids 2a, 2b, 2c and 2d. A trapezoid has two parallel sides and two non-parallel sides. As can be seen from FIG. 1, the upper section 1 has a multiple of interstices or openings of a square configuration and the second section 2 has oblong or rectangular interstices or openings. The square interstices are held to a minimum of between 8.00 mm and 11.00 mm. This assures that not even a finger of a human hand can be sucked into the sump by way of a forceful suction. The top of the dome-shaped section 1 has a flat location 3 thereon to receive an ID tag which will indicate the exact specification of the grate cover.

Figure 2:
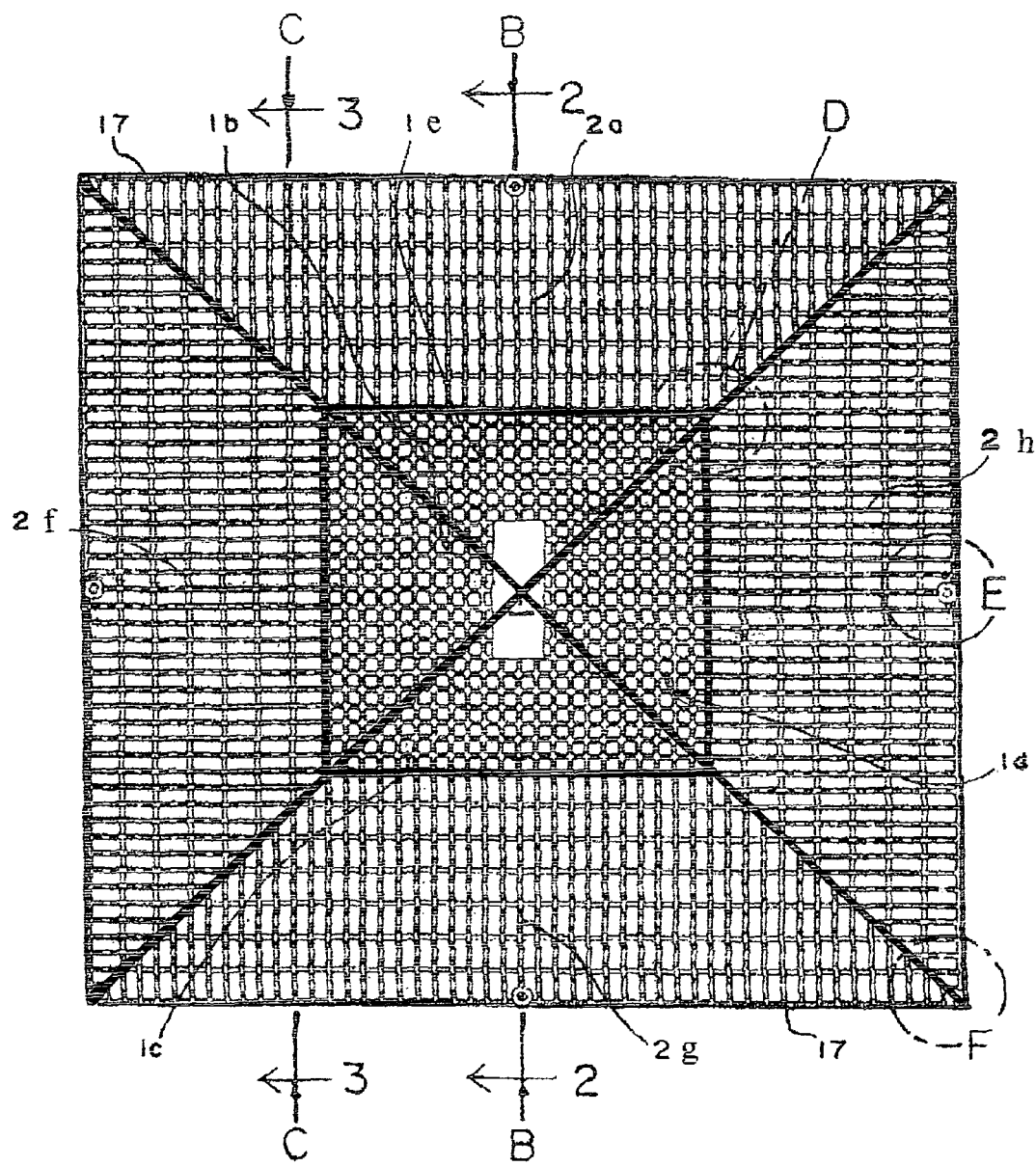
FIG. 2 is also a top view of the grate cover but showing a different geometric division of the upper section.

FIG. 2 is another top view of the grate having a dome-shaped section. Like, as it is shown in FIG. 1, the basic cover is in a square configuration and as seen from the top, there are four downwardly sloping triangles 1e, 1f, 1g and 1h. The remainder of FIG. 2 is the same as was explained in FIG. 1.

Figures 3, 4:
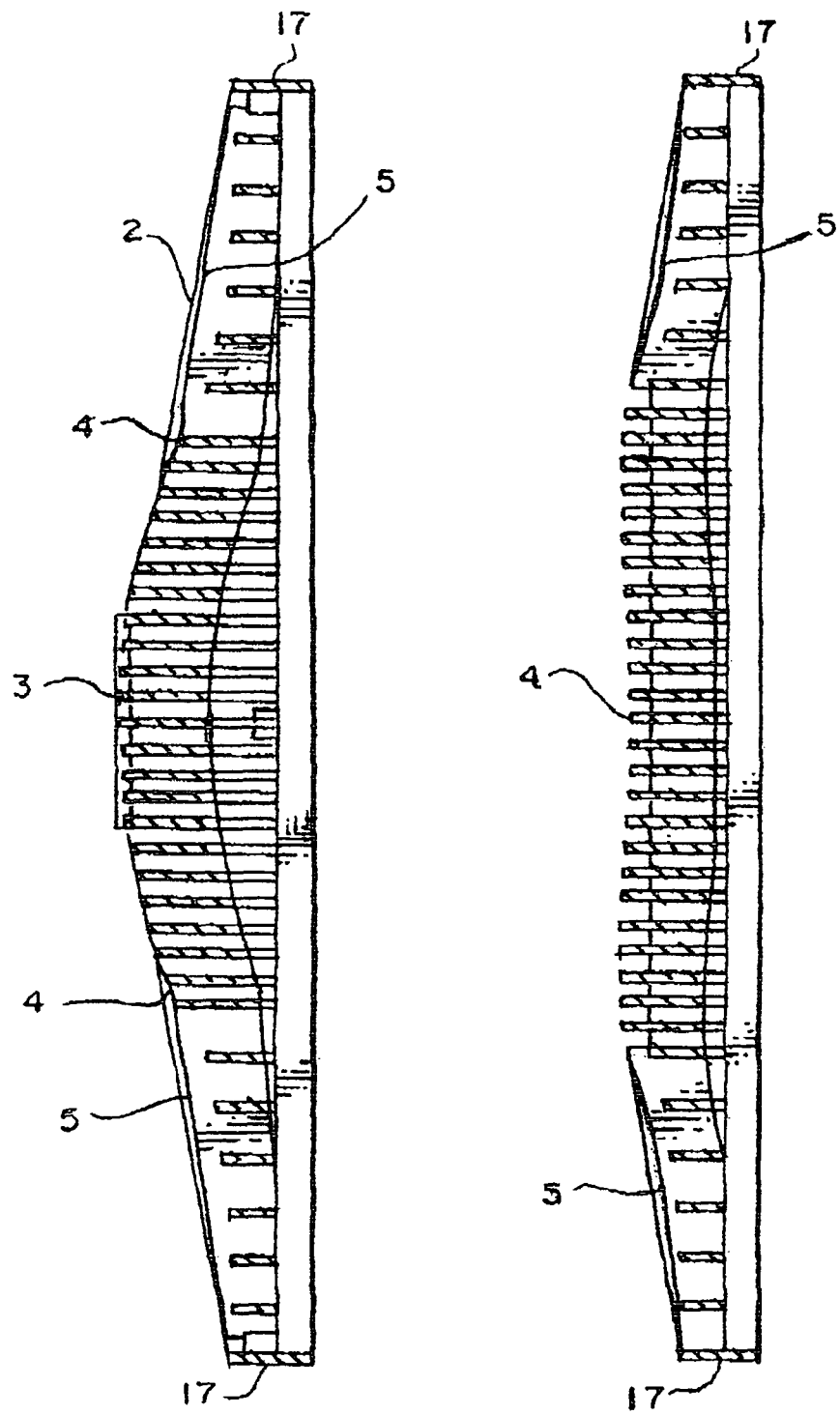
FIG. 3 is a cross sectional view of the grate cover taken along the line B-B of FIG. 1.
FIG. 4 is a cross sectional view of the grate cover taken along the line C-C of FIG. 1.

FIG. 3 is a cross sectional view of the grate cover. The view is taken along line B-B of FIG. 1. This view clearly shows the dome-shaped top section 1 as it tapers downwardly toward the lower section 2. At the transition between the upper section 1 and the lower section 2 there is slight surface concave curve 4 which blends into the lower section 2. The lower section shows a surface concave curve 5 as it curves downwardly toward the outside edge of the cover.

FIG. 4 is another cross sectional of the grate cover. This view is taken along the line C-C of FIG. 1.

Figure 5:
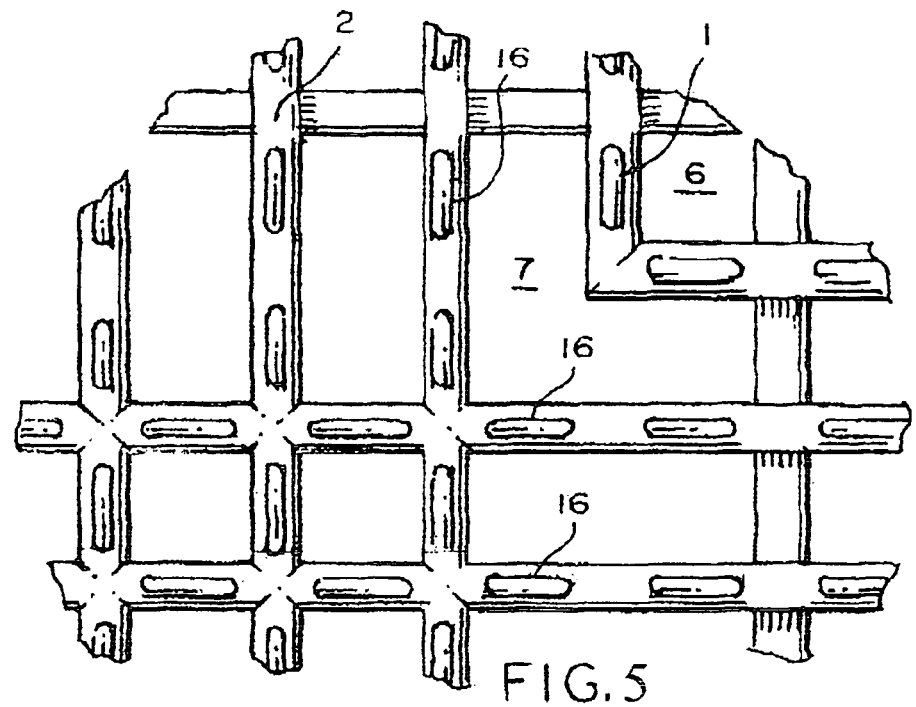
FIG. 5 is a detailed view of the transition between a first square or triangle and a second trapezoid as shown by circle D.

FIG. 5 is a top view of an area depicted in FIG. 1 by the circle D. This Fig. shows the square interstices 6 of the upper section 1 and the oblong or rectangular openings or interstices 7 of the lower section 2.

Figure 6:
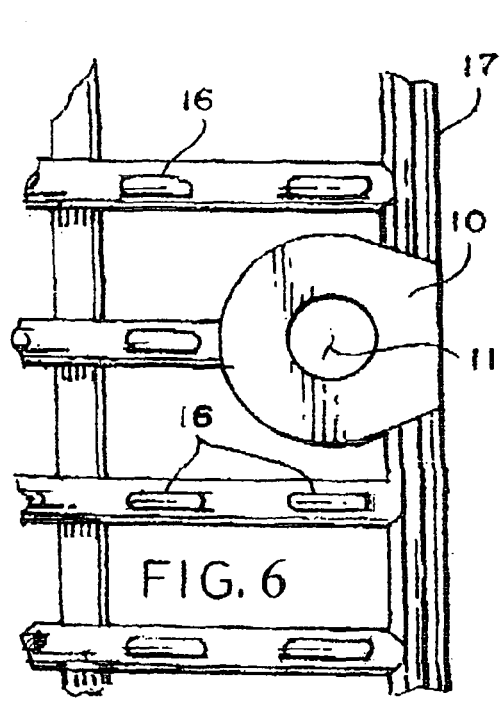
FIG. 6 shows a fastening element at a middle line of the cover as shown by the circle E.
Figure 7:
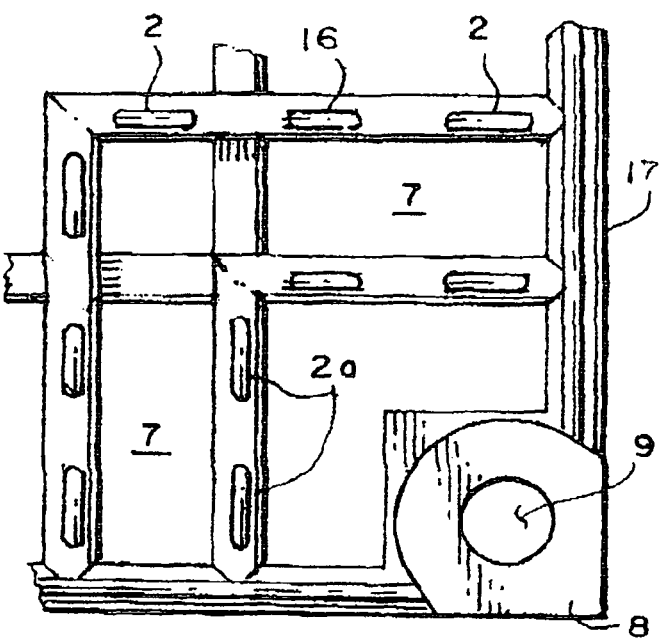
FIG. 7 shows a fastening element at a corner of the cover as shown by the circle F.
Figure 8:
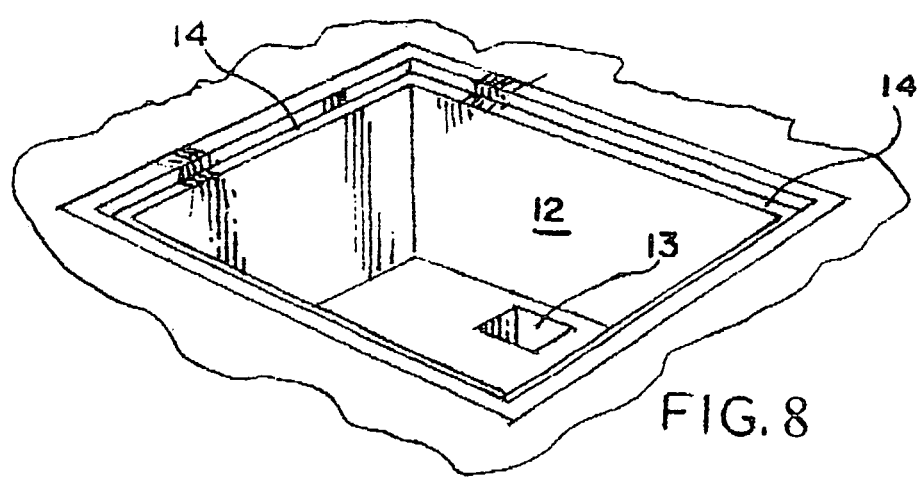
FIG. 8 is a perspective view of a sump in the bottom of the pool.

FIGS. 6 and 7 illustrate how the grate cover is fastened to the sump shown in FIG. 8. FIG. 6 shows a fastening element 10 of the grate cover lower section 2 that is located at about the middle line of the grate cover lower section 2 and has an opening 11 therein which is used to pass a fastener there through. Refer to the area depicted in FIG. 1 by the circle E. In FIG. 7 there is shown a corner 8 of the grate cover having an opening 9 therein which is used to pass a fastener there through into a recess of the sump. Refer to the area depicted in FIG. 1 by the circle F.

FIG. 8 illustrates a typical sump 12 which is normally of a square configuration although other shapes such as circular or rectangular may also be used. However, the square shape has proven to be most beneficial. The sump 12 has a suction outlet 13 in the bottom. The sump 12 has a recess 14 around its upper periphery which is used to insert the grate cover therein to be flush with the bottom of the pool or Jacuzzi.

Figure 9:
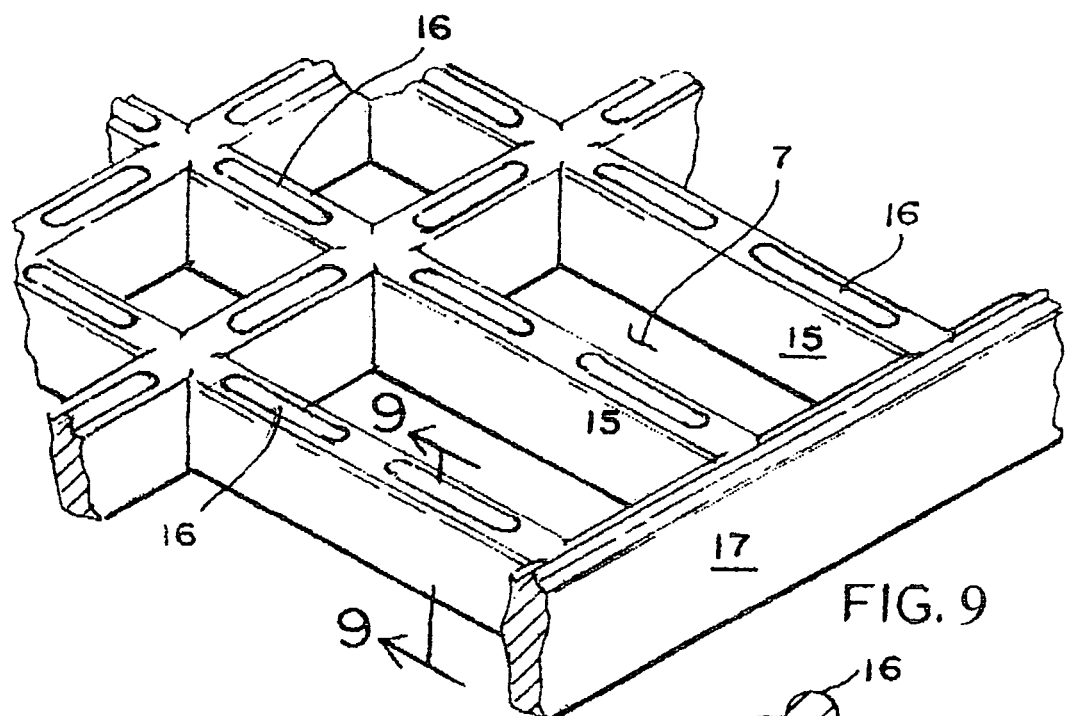
FIG. 9 is a perspective view of the various interstices of the pool cover.
Figure 10:
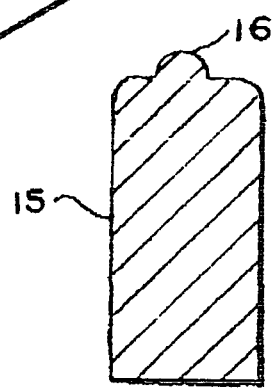
FIG. 10 is across section through a wall of the interstices.

FIGS. 9 and 10 show a detailed construction of the walls of the interstices or openings in the grate cover. The walls are shown at 15 and the upper surface of the walls have a reduced profile thereon to form ribs 16. This reduced profile 16 is instrumental in further minimizing the contact that can be had with the skin of a human when coning in contact with the grate cover.

It can now be seen that the pool grate cover is quite superior in performance when compared with the covers known in use including the co-pending application identified above. Experiments and tests have shown that the skin of a human cannot be attracted to the surface of the cover because the contact area is too small and the various curvatures on the top do not allow any areas of the body and the limbs to be attracted to the surface of the grate cover. The various concave curvatures of the top of the cover will always create lateral flows through the interstices and under any area of the human body. The suction force from inside of the sump cannot find enough contact areas to be effective to cause injuries.

This inventive grate cover should be installed in condo polls, apartment complexes, olympic size pools or even pools used in a home environment. The home environment use includes wading pools and the use of a Jacuzzi.

What I claim is:

1. A pool grate cover in combination with a sump, said grate cover being installed in a top recess of said sump, said grate cover having walls forming a multiple of openings therein, said grate cover has an upper and a lower section, said upper section having four squares, the squares of said upper section forming a dome-shaped configuration and having a concave surface curvature at a transition between said upper section and said lower section, said lower section having four trapezoids therein, each trapezoid of said lower section having a first surface concave curvature extending in a direction toward an outside of said grate cover.

2. The pool grate cover of claim 1, wherein said multiple of openings include openings in said upper section that are of a square configuration.

3. The pool grate cover of claim 1 including a flat area on top of said upper section for the reception of information with regard to the specification of said pool grate cover.

4. The pool grate cover of claim 1, wherein said multiple of openings include openings in said lower section that are of a rectangular configuration.

5. The pool grate cover of claim 1, wherein said walls forming a multiple of openings have reduction ribs thereon to limit a contact with the skin of a human making contact with said grate cover.

6. The pool grate cover of claim 1, said multiple of openings each have a dimension between 7 mm to 11 mm.

7. The pool grate cover of claim 1, wherein said multiple of openings include openings in said upper section that are of a square configuration, and openings in said lower section that are of a rectangular configuration.

8. A pool grate cover in combination with a sump, said grate cover being installed in a top recess of said sump, said grate cover having walls forming a multiple of openings therein, said grate cover has an upper and a lower section, said upper section having four triangles, the triangles of said upper section forming a dome-shaped configuration and having a concave surface curvature at a transition between said upper section and said lower section, said lower section having four trapezoids therein, each trapezoid of said lower section having a first surface concave curvature extending in a direction toward an outside of said grate cover.

9. The pool grate cover of claim 8, wherein said multiple of openings include openings in said upper section that are of a square configuration.

10. The pool grate cover of claim 8 including a flat area on top of said upper section for the reception of information with regard to the specification of said pool grate cover.

11. The pool grate cover of claim 8, wherein said multiple of openings include openings in said lower section that are of a rectangular configuration.

12. The pool grate cover of claim 8, wherein said walls forming a multiple of openings have reduction ribs thereon to limit a contact with the skin of a human making contact with said grate cover.

13. The pool grate cover of claim 8, wherein said multiple of openings each have a dimension between 7 mm to 11 mm.

14. The pool grate cover of claim 8, wherein said multiple of openings include openings in said upper section that are of a square configuration, and openings in said lower section that are of a rectangular configuration.

\* \* \* \* \*

UNITED STATES PATENT AND TRADEMARK OFFICE
CERTIFICATE OF CORRECTION

PATENT NO. : 8,951,413 B2  Page 1 of 1
APPLICATION NO. : 13/317013
DATED : February 10, 2015
INVENTOR(S) : Peter Snelling It is certified that error appears in the above-identified patent and that said Letters Patent is hereby corrected as shown below:

Title page, item (12), delete "Lawson" and insert --Snelling--.

Title page of patent, in item (75) Inventor, delete "Robert B. Lawson, Naples, FL (US)"; and insert --Peter Snelling, West Lakes, SA (AU)--.

Signed and Sealed this
Twelfth Day of May, 2015

Michelle K. Lee
*Director of the United States Patent and Trademark Office*